United States Patent
Guo et al.

(10) Patent No.: US 10,503,565 B2
(45) Date of Patent: Dec. 10, 2019

(54) SYSTEM AND METHOD FOR MULTICASTING DATA BETWEEN NETWORKING INTERFACES OF HYPERVISORS

(71) Applicant: Nicira, Inc., Palo Alto, CA (US)

(72) Inventors: Fei Guo, Beijing (CN); Yonggang Wang, Beijing (CN); Keyong Sun, Beijing (CN); Dousheng Zhao, Beijing (CN); Lele Zhang, Beijing (CN)

(73) Assignee: Nicira, Inc., Palo Alto, CA (US)

( * ) Notice: Subject to any disclaimer, the term of this patent is extended or adjusted under 35 U.S.C. 154(b) by 212 days.

(21) Appl. No.: 15/652,150

(22) Filed: Jul. 17, 2017

(65) Prior Publication Data

US 2019/0018716 A1    Jan. 17, 2019

(51) Int. Cl.
| | | |
|---|---|---|
| *H04L 29/06* | (2006.01) | |
| *G06F 9/54* | (2006.01) | |
| *G06F 9/455* | (2018.01) | |
| *H04L 12/18* | (2006.01) | |
| *H04L 12/931* | (2013.01) | |
| *H04L 12/46* | (2006.01) | |

(52) U.S. Cl.
CPC .......... *G06F 9/542* (2013.01); *G06F 9/45558* (2013.01); *H04L 12/18* (2013.01); *H04L 12/1886* (2013.01); *H04L 12/4633* (2013.01); *H04L 49/201* (2013.01); *H04L 63/0272* (2013.01); *G06F 9/546* (2013.01); *G06F 2009/45595* (2013.01); *H04L 12/465* (2013.01); *H04L 2012/4629* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,103,902 | B1* | 10/2018 | Sampath | H04L 12/467 |
| 2014/0092907 | A1* | 4/2014 | Sridhar | H04L 45/74 |
| | | | | 370/392 |
| 2015/0236871 | A1* | 8/2015 | Kang | H04L 12/4633 |
| | | | | 370/390 |
| 2018/0006930 | A1* | 1/2018 | Du | H04L 12/4641 |

* cited by examiner

*Primary Examiner* — Zhiren Qin
(74) *Attorney, Agent, or Firm* — Loza & Loza, LLP

(57) ABSTRACT

A host computer and method for multicasting data between networking interfaces of hypervisors in a distributed computer system uses a Virtual Extensible LAN Network Identifier (VNI) assigned to a multicast group and an identifier of a VXLAN Tunnel End Point (VTEP) of the host computer associated to the VNI so that data being multicast for the multicast group can be routed to the networking interfaces via VTEPs associated with the VNI.

20 Claims, 9 Drawing Sheets

SYSTEM AND METHOD FOR MULTICASTING DATA BETWEEN NETWORKING INTERFACES OF HYPERVISORS

BACKGROUND

Multicast is an efficient way of disseminating information and communicating over a network. With multicast, a single transmitting device can connect to multiple receiving devices and exchange information while conserving network bandwidth. Financial stock exchanges, multimedia content delivery networks, and commercial enterprises often use multicast as a communication mechanism. With virtualization technology, multicast efficiency can be further enhanced. For example, VMware virtualization enables multiple receiving virtual machines on a single host. In the case where the receiving virtual machines are on the same host, the physical network does not have to transfer multiple copies of the same packet. Packet replication may be carried out at the host, i.e., in the hypervisor, instead.

Multicast in a virtualized environment can be used for various application. As an example, VMware vSAN™, a storage virtualization technology, uses multicast groups to monitor a vSAN cluster's membership, check heartbeats between nodes, publish local services to a cluster directory, etc. However, enabling multicast in a virtualized environment may introduce limitations or problems in deployment and/or maintenance. For VSAN, a customer needs to configure Internet Group Management Protocol (IGMP) snooping in customer's physical switch side. In addition, if the customer's environment crosses a router, the customer needs to also configure multicast route protocol, such as Protocol Independent Multicast (PIM). However, but most customers do not want to configure PIM since such configuration for PIM may introduce some vulnerability issues with respect to security. Furthermore, the extra configuration for IGMP snooping on the physical switch may also introduce maintenance complexity for many network partition cases, which are due to IGMP snooping configuration errors on the physical switch side.

SUMMARY

A host computer and method for multicasting data between networking interfaces of hypervisors in a distributed computer system uses a Virtual Extensible LAN Network Identifier (VNI) assigned to a multicast group and an identifier of a VXLAN Tunnel End Point (VTEP) of the host computer associated to the VNI so that data being multicast for the multicast group can be routed to the networking interfaces via VTEPs associated with the VNI.

A method for multicasting data between networking interfaces of hypervisors in a distributed computer system in accordance with an embodiment of the invention comprises receiving a request to join a particular multicast group from a software process connected to a networking interface of a hypervisor in a host computer at a multicast agent module of the host computer, sending a query from the multicast agent module to a logical network manager for a Virtual Extensible LAN Network Identifier (VNI) assigned to the particular multicast group, receiving the VNI assigned to the particular multicast group from the logical network manager at the multicast agent module, sending a VNI join message to the logical network manager from the multicast agent module to join a Virtual Extensible LAN (VXLAN) segment defined by the VNI, and sending an identifier of a VXLAN Tunnel End Point (VTEP) of the host computer to the logical network manager from the multicast agent module to be associated with the VNI so that data being multicast for the particular multicast group can be routed to the networking interface via the VTEP. In some embodiments, the steps of this method are performed when program instructions contained in a transitory computer-readable storage medium is executed by one or more processors.

A host computer of a distributed computer system in accordance with an embodiment of the invention comprises memory and a processor. The processor is configure to receive a request to join a particular multicast group from a software process connected to a networking interface of a hypervisor in the host computer at a multicast agent module of the host computer, send a query from the multicast agent module to a logical network manager of the distributed computer system for a Virtual Extensible LAN Network Identifier (VNI) assigned to the particular multicast group, receive the VNI assigned to the particular multicast group from the logical network manager at the multicast agent module, send a VNI join message to the logical network manager from the multicast agent module to join a Virtual Extensible LAN (VXLAN) segment defined by the VNI, and send an identifier of a VXLAN Tunnel End Point (VTEP) of the host computer to the logical network manager from the multicast agent module to be associated with the VNI so that data being multicast for the particular multicast group can be routed to the networking interface via the VTEP.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
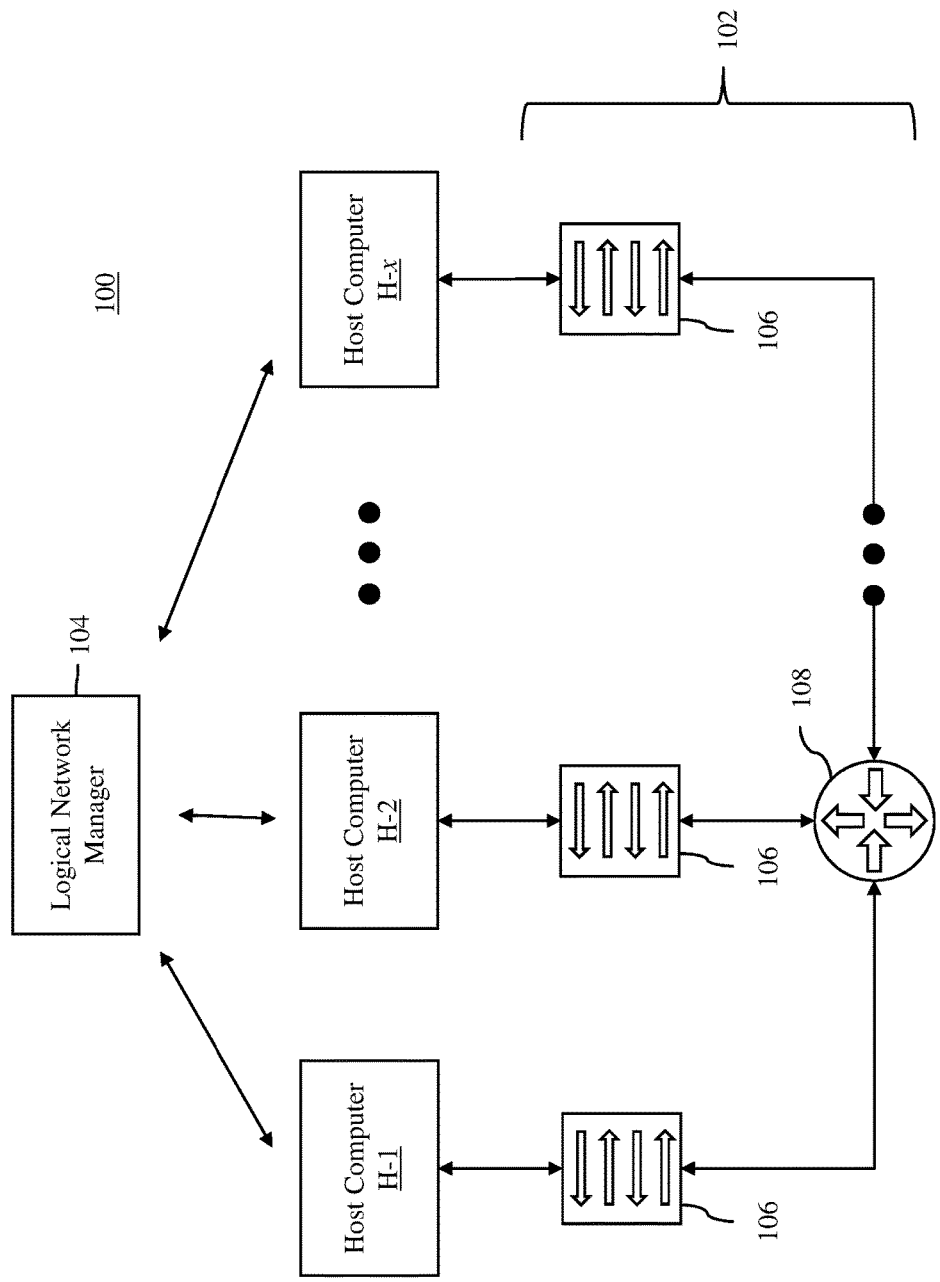
FIG. 1 is a block diagram of a distributed computer system in accordance with an embodiment of the invention.

Turning now to FIG. 1, a distributed computer system 100 in accordance with an embodiment of the invention is shown. As depicted in FIG. 1, the distributed computer system 100 includes a number of host computers H-1, H-2 . . . H-x (where x is a positive integer), a physical network 102 and a logical network manager 104. The host computers are connected to each other via the physical network, and thus, communications between the host computers are routed through the physical network, which may comprise multiple subnets. The host computers are also connected to the logical network manager. In an embodiment, the host computers are connected to the network manager via the physical network. However, in other embodiments, the host computers may be connected to the network manager using other means, such as dedicated communication channels between the host computers and the logical network manager.

The host computers H-1, H-2 . . . H-x of the distributed computer system 100 are physical computer systems that are used to support or host multiple virtual processing instances that can execute various applications. As used herein, the term "virtual processing instance" is any software entity that can run on a computer system, such as a software application, a software process, a virtual machine (VM) and a "container" that provides system-level process isolation, e.g., a Docker container. The host computers may be servers that are commonly found in datacenters. As an example, the host computers may be servers installed on different server racks.

Figure 2:
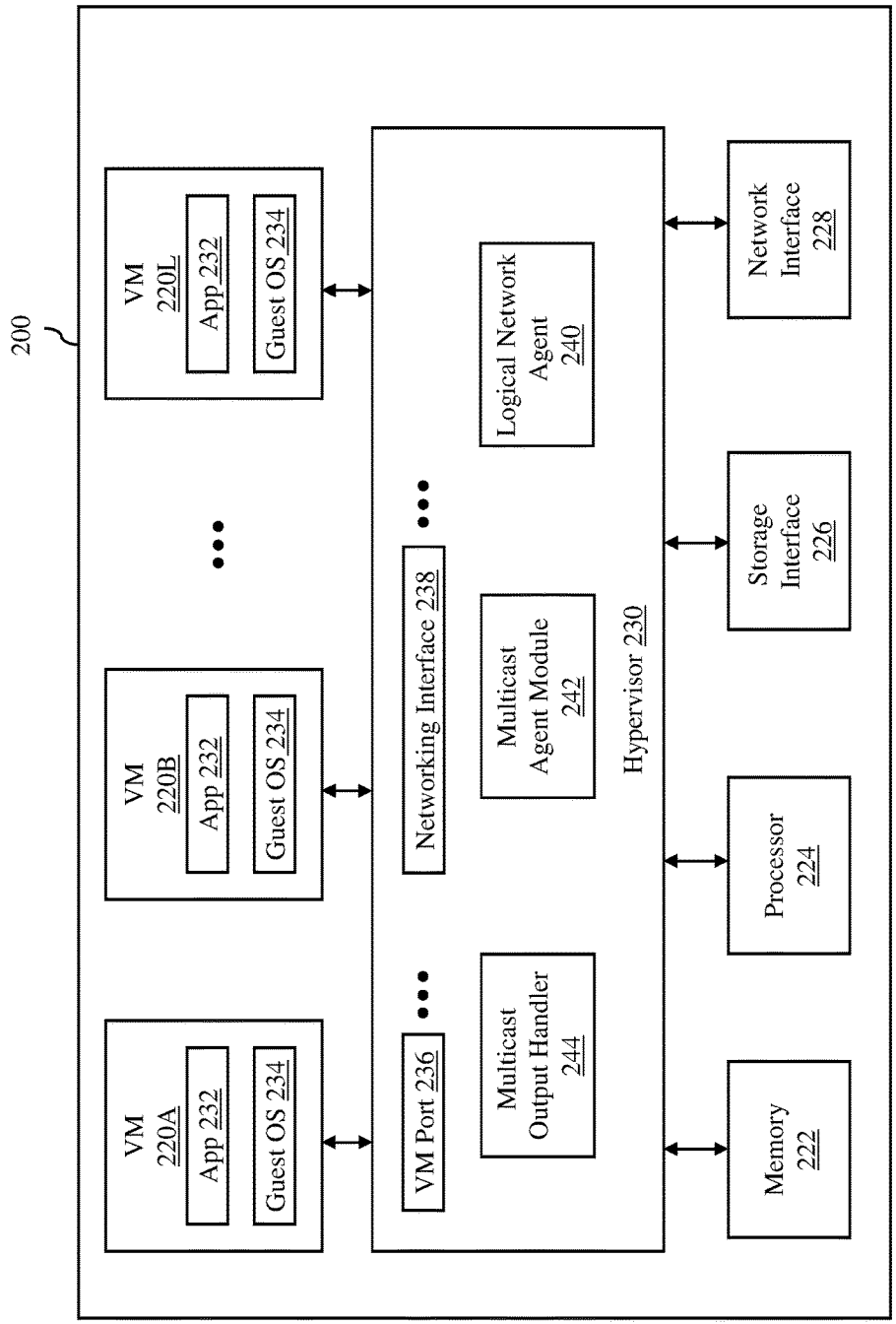
FIG. 2 is a block diagram of a host computer in accordance with an embodiment of the invention.

Turning now to FIG. 2, components of a host computer 200 that is representative of the host computers H-1, H-2 . . . H-x in accordance with an embodiment of the invention are shown. In FIG. 2, the physical connections between the various components of the host computer are not illustrated. In the illustrated embodiment, the host computer is configured to support a number of virtual processing instances 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with storage, which can be any kind of storage, such as locally attached disks or solid-state devices (SSDs), a network-attached storage (NAS), a storage area network (SAN) or a VSAN. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by hypervisor 230, and, among other things, guest operating system 234 forms a software platform on top of which guest applications 234 run.

The hypervisor 230 includes multiple virtual processing instance ports 236, e.g., VM interface ports or "VM ports", and one or more networking interfaces 238. The VM ports of the hypervisor 230 may be used to connect VMs to virtual switches. In an embodiment, each VM port, which may be assigned a VLAN identification, supports a VM port group that logically isolates communications between the VMs in the same VM port group. The VM ports are analogous to physical ports on a physical network switch and do not have IP addresses. The networking interfaces of the hypervisor, such as VMkernel interfaces or ports, are used to connect software processes running on the host computer, such as processes of a VMkernel, to services that the software processes control. As an example, the networking interfaces may be used for VSAN network features, such as VSAN cluster membership monitoring, heartbeat check between nodes and publication of local services to a VSAN cluster directory. In an embodiment, each networking interface is assigned an Internet Protocol (IP) address to connect to the service to which a software process is connected.

In the illustrated embodiment, the hypervisor 230 includes a logical network agent 240, which operates to provide logical networking capabilities, such as bridging, L3 routing, L2 switching and firewall capabilities, so that software defined networks or logical networks can be created. The logical network agent 240 may be part of a VMware NSX® logical network product installed in the host computer 200 ("VMware NSX" is a trademark of VMware, Inc.). In a particular implementation, the logical network agent 240 may be a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as STT, NVGRE, or Geneve, instead of, or in addition to, VXLAN.

The hypervisor 230 also includes a multicast agent module 242 and a multicast output handler 244. The multicast agent module 242 is configured or programmed to manage multicast membership for the networking interfaces 238. As explained in more detail below, the multicast agent module 242 executes operations to facilitate the networking interfaces 238 in joining or leaving multicast groups. The multicast output handler 244 is configured or programmed to snoop data traffic from the networking interfaces 238 to detect multicast data for one or more multicast groups. As explained in more detail below, when multicast data for a multicast group is detected, the multicast output handler 244 attaches a VNI as internal metadata to the multicast data so that the multicast data is transmitted to all members of the multicast group.

Turning back to FIG. 1, the physical network 102 can be any type of computer network or a combination of networks that allows communications between devices connected to the network. The physical network 102 may include the Internet, a wide area network (WAN), a local area network (LAN), a storage area network (SAN), a Fibre Channel network and/or other networks. The physical network 102 may be configured to support protocols suited for communications with storage arrays, such as Fibre Channel, Internet Small Computer System Interface (iSCSI), Fibre Channel over Ethernet (FCoE) and HyperSCSI. As illustrated in FIG. 1, the physical network 102 may include switches 106, one or more routers 108 and other physical networking components (not shown).

The virtual network manager 104 of the distributed computer system 100 operates to manage and control virtual networks in the distributed computer system. Virtual networks, also referred to as logical overlay networks, comprise logical network devices and connections that are then mapped to physical networking resources, e.g., the switches 106 and the routers 108, in a manner analogous to the manner in which other physical resources as compute and storage are virtualized. In an embodiment, the virtual network manager has access to information regarding physical components in the distributed computer system, such as the host computers H-1, H-2 . . . H-x, the switches 106 and the routers 108, and virtual network components in the distributed computer system, such as logical switches, logical routers and security devices. With the physical and virtual network information, the virtual network manager is able to map logical network configurations to the physical network components that convey, route, and filter physical traffic in the distributed computer system. In one particular implementation, the virtual network manager is a VMware NSX™ manager running on a physical computer in the distributed computer system, similar to the host computer 200 shown in FIG. 2.

In an embodiment, the virtual network manager 104 operates with the hypervisors in the host computers H-1, H-2 . . . H-x to enable multicast of data between networking interfaces of hypervisors in multicast groups. Thus, data originating from a source networking interface of a hypervisor in a multicast group can be multicast to other networking interfaces of hypervisors in the same multicast group. The multicast data may be generated from any software process running on a host computer that is connected to the source networking interface of the hypervisor in the host computer. As explained in detail below, the virtual network manager operates with the multicast agent modules of the host computers to facilitate networking interfaces of the hypervisors in the host computers to join and leave multicast groups to enable multicast functionality within the multicast groups.

Figure 3:
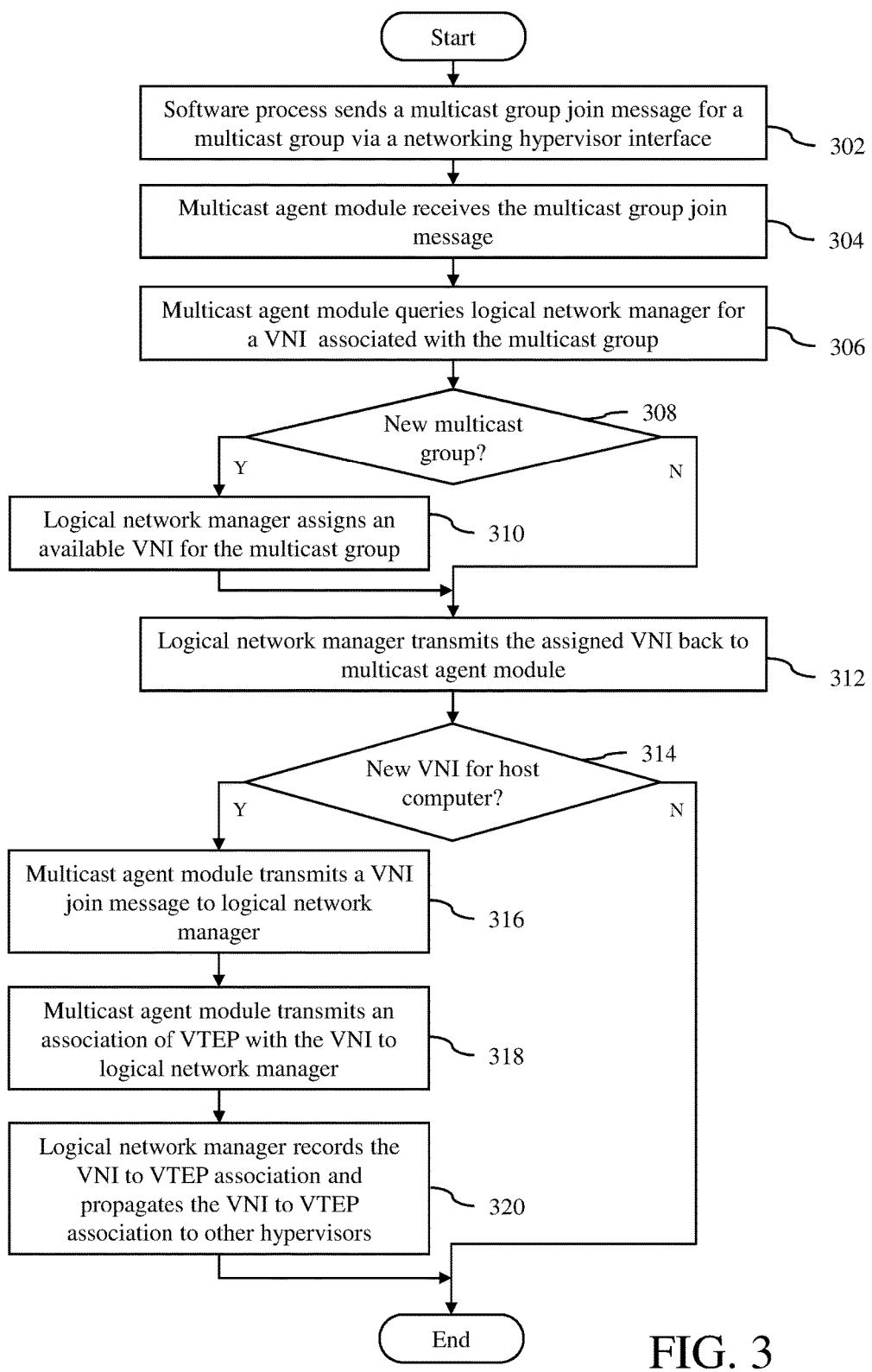
FIG. 3 is a flow diagram of a process of joining a multicast group for networking interfaces of hypervisors in the distributed computer system in accordance with an embodiment.

A process of joining a multicast group for networking interfaces of hypervisors in the distributed computer system 100 in accordance with an embodiment of the invention is described with references to the flow diagram of FIG. 3. As shown in FIG. 3, the process for joining a multicast group begins at step 302, where a software process in a host computer in the distributed computer system sends a multicast group join message for the multicast group via a networking interface of a hypervisor ("a networking hypervisor interface") of the host computer. In an embodiment, the multicast group join message may be an Internet Group Management Protocol (IGMP) join message. In one implementation, the software process may be a process of a VMkernel of a ESXi™ host and the networking hypervisor interface may be a VMkernel interface or port of the ESXi™ host ("ESXi" is a trademark of VMware, Inc).

Next, at block 304, the multicast agent module in the host computer receives the multicast group join message. In the embodiment where the multicast group join message is an IGMP join message, the multicast agent module may be configured or programmed to monitor messages from networking hypervisor interfaces of the host computer to detect IGMP messages. Next, at block 306, the multicast agent module queries the logical network manager 104 for a VXLAN Network Identifier (VNI) associated with the multicast group. In one implementation using ESXi™ hosts, the communication between the multicast agent module and the network manager may be made using a communication channel between a netcpa daemon running on the host computer and the logical network manager.

Next, at block 308, the logical network manager 104 determines whether the multicast group in the query from the multicast agent module is a new multicast group or an existing multicast group. If the multicast group in the query is a new multicast group, the logical network manager assigns an available VNI for the multicast group, at block 310. This assignment of the VNI to the multicast group may be stored in any format, such as a VNI-multicast group table, in a multicast database, which can be stored in any storage accessible by the logical network manager. The process then proceeds to step 312. However, if the multicast group in the query is an existing multicast group, the process proceeds directly to step 312 since a VNI would be already assigned to an existing multicast group and stored in the multicast database.

At block 312, the logical network manager transmits the VNI assigned to the multicast group back to the multicast agent module in response to the query from the multicast agent module.

Next, at block 314, the multicast agent module determines whether the received VNI is a new multicast VNI for the host computer. That is, the multicast agent module determines whether the received VNI has been assigned to the VTEP at the hypervisor in the host computer for the multicast group. This determination may be achieved by performing a lookup on a local multicast database for the hypervisor, which includes any VNI to VTEP associations. The local multicast database may be stored in any storage accessible by multicast agent module. If the VNI is a new multicast VNI, the multicast agent module transmits a VNI join message to the network manager to inform the logical network manager that the host computer wants to join the multicast group assigned to the VNI, at step 316. In an embodiment, the VNI to multicast group association may be stored in the local multicast database.

Figure 4:
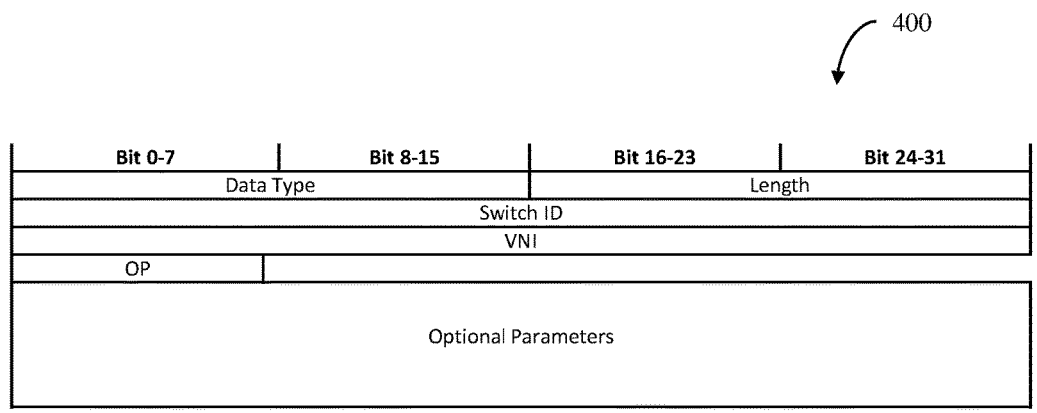
FIG. 4 is a VNI membership message in accordance with an embodiment of the invention.

An example of a VNI join message is illustrated in FIG. 4, which shows a VNI membership message 400 that can be used as a VNI join message or a VNI leave message. As shown in FIG. 4, the VNI membership message includes a data type field, a length field, a switch ID field, a VNI field, an OP field and an operational parameters field. The data type field indicates the data type of the message. The length field indicates the size of the message. The switch ID field may indicate an ID of one distributed virtual switch (DVS) instance or indicate all DVS instances, which allows multiple switch instances to multiplex the same agent connection. The VNI field includes the VNI. The OP field is used to indicate whether the message is a VNI join message or a VNI leave message. The optional parameters field is used to indicate optional parameters.

Turning back to the process flow diagram of FIG. 3, at step 318, the multicast agent transmits an association of VTEP of the host computer with the VNI to the logical network manager 104. In an embodiment, the multicast agent transmits the IP address of the VTEP at the host computer with the VNI to indicate the association of the VTEP with the VNI. Next, at step 320, the logical network manager records the new VNI to VTEP association and propagates the new VNI to VTEP association to other hypervisors in the multicast group using the same VNI. The new VNI to VTEP association may be stored in the multicast database, which is accessible by the network manager. The process then comes to an end.

Figure 5:
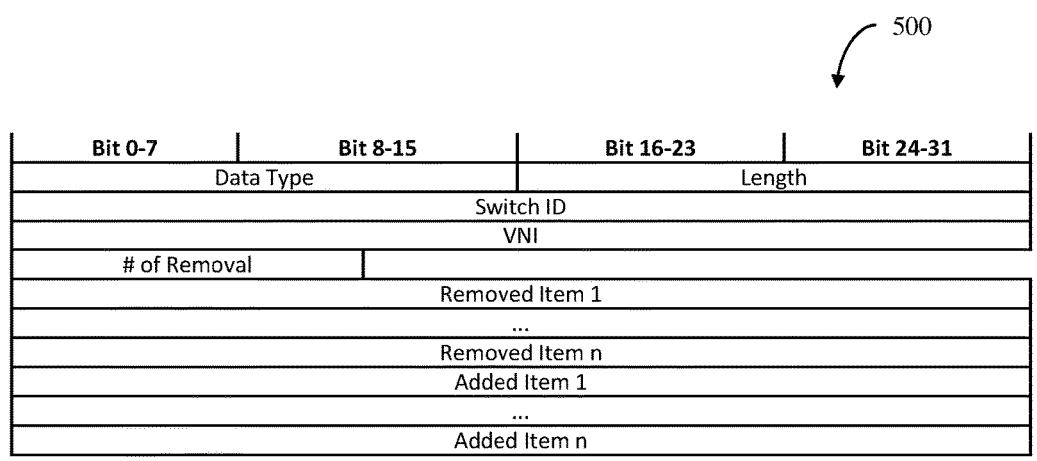
FIG. 5 is a VTEP membership message in accordance with an embodiment of the invention.

In an embodiment, the new VNI to VTEP association may be propagated using the same VNI to the other hypervisors in the multicast group using a VTEP membership message. An example of a VTEP membership message 500 in accordance with an embodiment of the invention is illustrated in FIG. 5. As shown in FIG. 5, the VTEP membership message includes a data type field, a length field, a switch ID field, a VNI field, a number of removal field, one or more removed item fields and one or more added item fields. The data type, length, switch ID and VNI fields are same as the VNI membership message 400 shown in FIG. 4. The number of removal field indicates the number of removed items in the message. Each removed item field includes an IP address of a VTEP that has been removed for the VNI. Each added item field includes an IP address of a VTEP that has been added for the VNI and a segment ID, which specifies the logical segment of a VXLAN.

Turning back to the process flow diagram of FIG. 3, if the multicast agent module determines that the VNI is not a new multicast VNI for the host computer, at step 314, the process directly comes to an end since the VTEP at the host computer would already be associated with the VNI.

Figure 6:
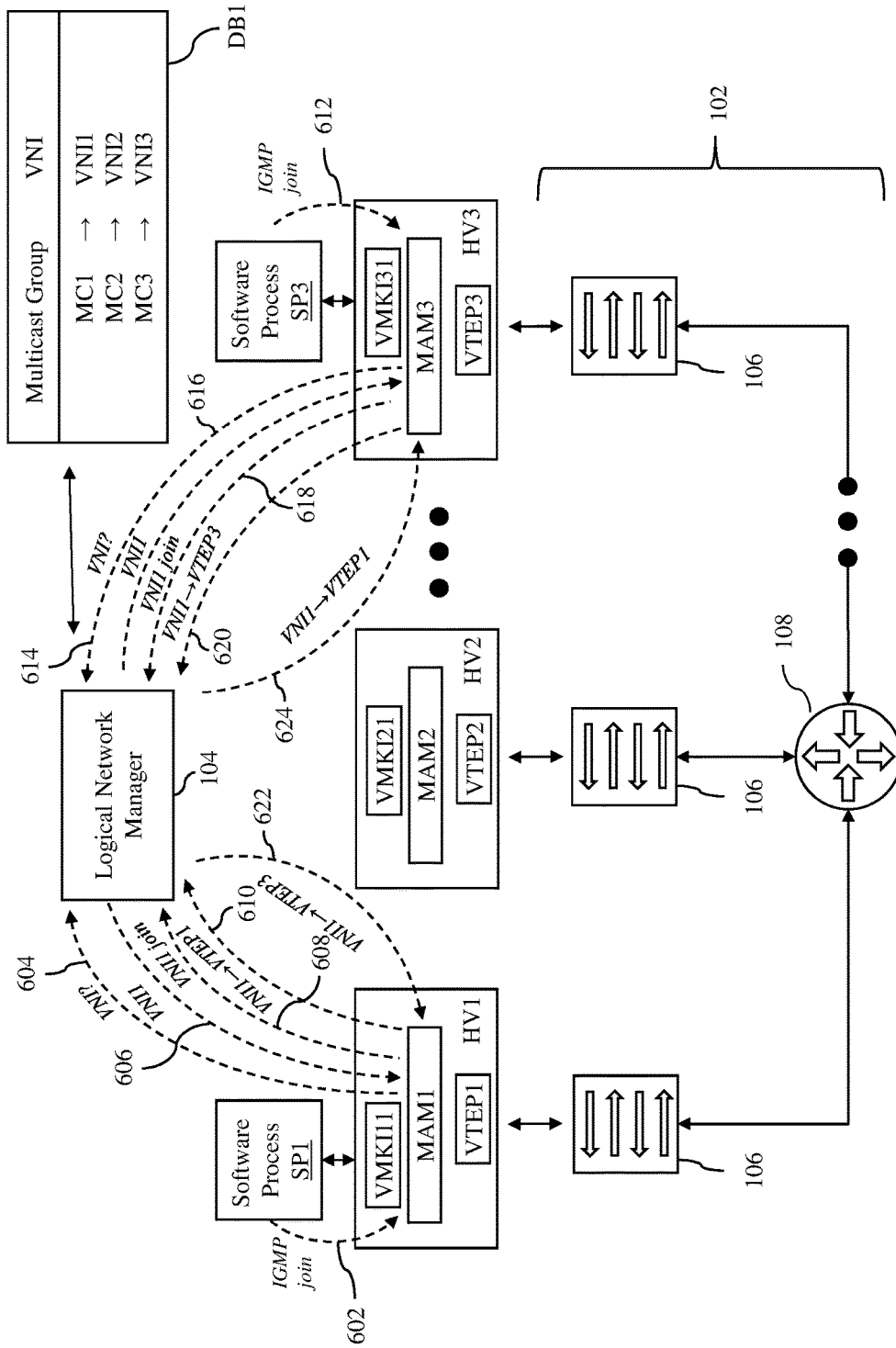
FIG. 6 illustrates the process of joining a multicast group for networking interfaces of hypervisors in the distributed computer system in accordance with an embodiment of the invention.

The process of joining a multicast group for networking interfaces of hypervisors in the distributed computer system 100 in accordance with an embodiment of the invention is further described using an example illustrated in FIG. 6. In this example, there are three host computers that are represented by three hypervisors HV1, HV2 and HV3. Each hypervisor includes a logical network agent, which is indicated as a VTEP, a multicast agent module and a networking interface, which is a VMkernel interface in this example. In particular, the hypervisor HV1 includes a VTEP1, a VMkernel interface VMKI11 and a multicast agent module MAM1. Similarly, the hypervisor HV2 includes a VTEP2, a VMkernel interface VMKI21 and a multicast agent module MAM2. The hypervisor HV3 includes a VTEP3, a VMkernel interface VMKI31 and a multicast agent module MAM3. For the hypervisor HV1, a software process SP1 is connected the VMkernel interface VMKI11. For the hypervisor HV3, a software process SP3 is connected the VMkernel interface VMKI31. In this example, the software processes SP1 and SP3 are processes of VMkernels running on the different host computers.

In this description, it is assumed that the VMkernel interfaces VMKI11 and VMKI31 both want to join a multicast group MC1. It is also assumed that the VMkernel interface VMKI11 will first join the multicast group MC1 as the first member of the group and then VMkernel interface VMKI31 will join the multicast group MC1 as the second member of the group.

For the VMkernel interface VMKI11 to join the multicast group MC1, the software process SP1 sends out an IGMP join message via the VMkernel interface VMKI11 to the multicast agent module MAM1, as indicated by the arrow 602. In response, the multicast agent module MAM1 sends a query to the logical network manager 104 for a VNI assigned to the multicast group MC1, as indicated by the arrow 604. Since the multicast group MC1 is a new multicast group and a VNI has not been assigned to the multicast group MC1, the logical network manager assigns VNI1 to the multicast group MC1 and records the information in a multicast database DB1, which is stored in a storage accessible by the logical network manager. In addition, the logical network manager sends VNI1 assigned to the multicast group MC1 back to the multicast agent module MAM1, as indicated by arrow the 606. The multicast agent module MAM1 then sends a VNI1 join message to the logical network manager, as indicated by the arrow 608. The multicast agent module MAM1 also sends an association of VTEP1 with VNI1 to the network manager, as indicated by the arrow 610. The logical network manager then records the VTEP1 to VNI1 association. Since there are no other member of the multicast group MC1, the logical network manager does not have to propagate this VTEP1 to VNI1 association.

For the VMkernel interface VMKI31 to join the multicast group MC1, the software process SP3 sends out an IGMP join message via the VMkernel interface VMKI31 to the multicast agent module MAM3, as indicated by the arrow 612. In response, the multicast agent module MAM3 sends a query to the logical network manager 104 for a VNI assigned to the multicast group MC1, as indicated by the arrow 614. Since the multicast group MC1 is an existing multicast group, the logical network manager looks up the VNI assigned to the multicast group MC1 in the multicast database DB1, which in this example is VNI1. The logical network manager then sends VNI1 assigned to the multicast group MC1 back to the multicast agent module MAM3, as indicated by the arrow 616. The multicast agent module MAM3 then sends a VNI1 join message to the logical network manager, as indicated by arrow the 618. The multicast agent module MAM3 also sends an association of VTEP3 with VNI1 to the network manager, as indicated by the arrow 620. The logical network manager then records the VTEP3 to VNI association. In addition, the logical network manager propagates the VTEP3 to VNI1 association to the hypervisor HV1, as indicated by the arrow 622. The logical network manager also propagates the VTEP1 to VNI1 association to the hypervisor HV3, as indicated by the arrow 624. These notifications may be achieved by sending VTEP membership messages, similar to the VTEP membership message 500 shown in FIG. 5, to each hypervisor of the multicast group MC1.

Figure 7:
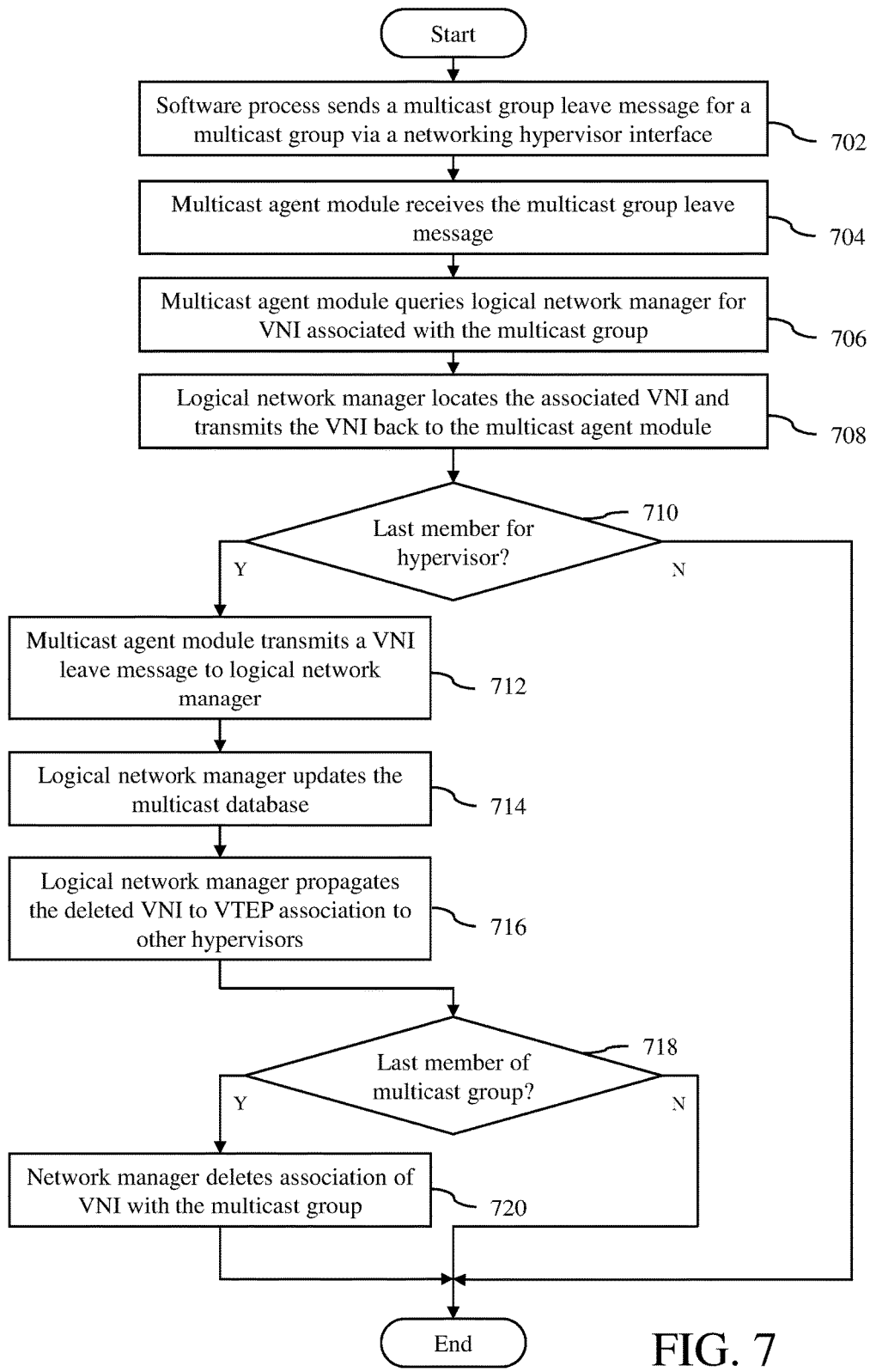
FIG. 7 is a flow diagram of a process of leaving a multicast group for networking interfaces of hypervisors in the distributed computer system in accordance with an embodiment.

A process of leaving a multicast group for networking interface of hypervisors in the distributed computer system 100 in accordance with an embodiment of the invention is described with reference to the flow diagram of FIG. 7. As shown in FIG. 7, the process for leaving a multicast group begins at step 702, where a software process sends a multicast group leave message for the multicast group via a networking interface of a hypervisor ("a networking hypervisor interface") of a host computer. In an embodiment, the multicast group leave message may be an IGMP leave message. In one implementation, the software process may be a process of a VMkernel of a ESXi™ host and the networking hypervisor interface may be a VMkernel interface or port of the ESXi™ host.

Next, at block 704, the multicast agent module in the hypervisor receives the multicast group leave message. In the embodiment where the multicast group leave message is an IGMP leave message, the multicast agent module may be configured or programmed to monitor messages originating from any networking hypervisor interface of the host computer to detect IGMP messages. Next, at block 706, the multicast agent module queries the logical network manager 104 for a VNI associated with the multicast group.

Next, at block 708, the network manager locates the VNI associated with the multicast group and transmits the VNI back to the multicast agent module in response to the query from the multicast agent module. In particular, the logical network manager performs a lookup on the multicast database to find the VNI that is associated with the multicast group.

In some embodiments, VNI to multicast group associations may be stored locally at the host computer in a local multicast cache. In these embodiments, the VNI associated with the multicast group may be retrieved from the local multicast cache. Thus, in these embodiments, steps 706 and 708 are not needed.

Next, at step 710, the multicast agent module determines whether the networking hypervisor interface is the last member of the multicast group for the host computer. If the networking hypervisor interface is the last member of the multicast group for the host computer, the multicast agent module transmits a VNI leave message to the logical network manager to remove the association of the VNI with the VTEP of the hypervisor, at step 712. In an embodiment, the VNI leave message may be a VNI membership message as illustrated in FIG. 4. Next, at step 714, the logical network manager updates the multicast database to reflect the removal of the association between the VNI and the VTEP of the hypervisor. This step may involve recording the removal of the VTEP for the VNI in the multicast database. Next, at step 716, the logical network manager propagates the removal of the VNI to VTEP association to the other hypervisors. In an embodiment, a VTEP membership message as illustrate in FIG. 5 may be used to notify the removal of the VNI to VTEP association to the other hypervisors. The process then proceeds to step 718. However, if, at step 710, it is determined that the networking hypervisor interface is not the last member of the multicast group for the host computer, the process comes to an end.

At step 718, the logical network manager 104 determines whether the networking hypervisor interface is the last member of the multicast group. If so, the logical network manager deletes the association of the VNI with the multicast group in the multicast database. Thus, the VNI is now available for another use, such as being assigned to the next new multicast group. The process then comes to an end.

However, if it is determined that the networking hypervisor interface is not the last member of the multicast group, at step 718, the process directly comes to an end.

Figure 8:
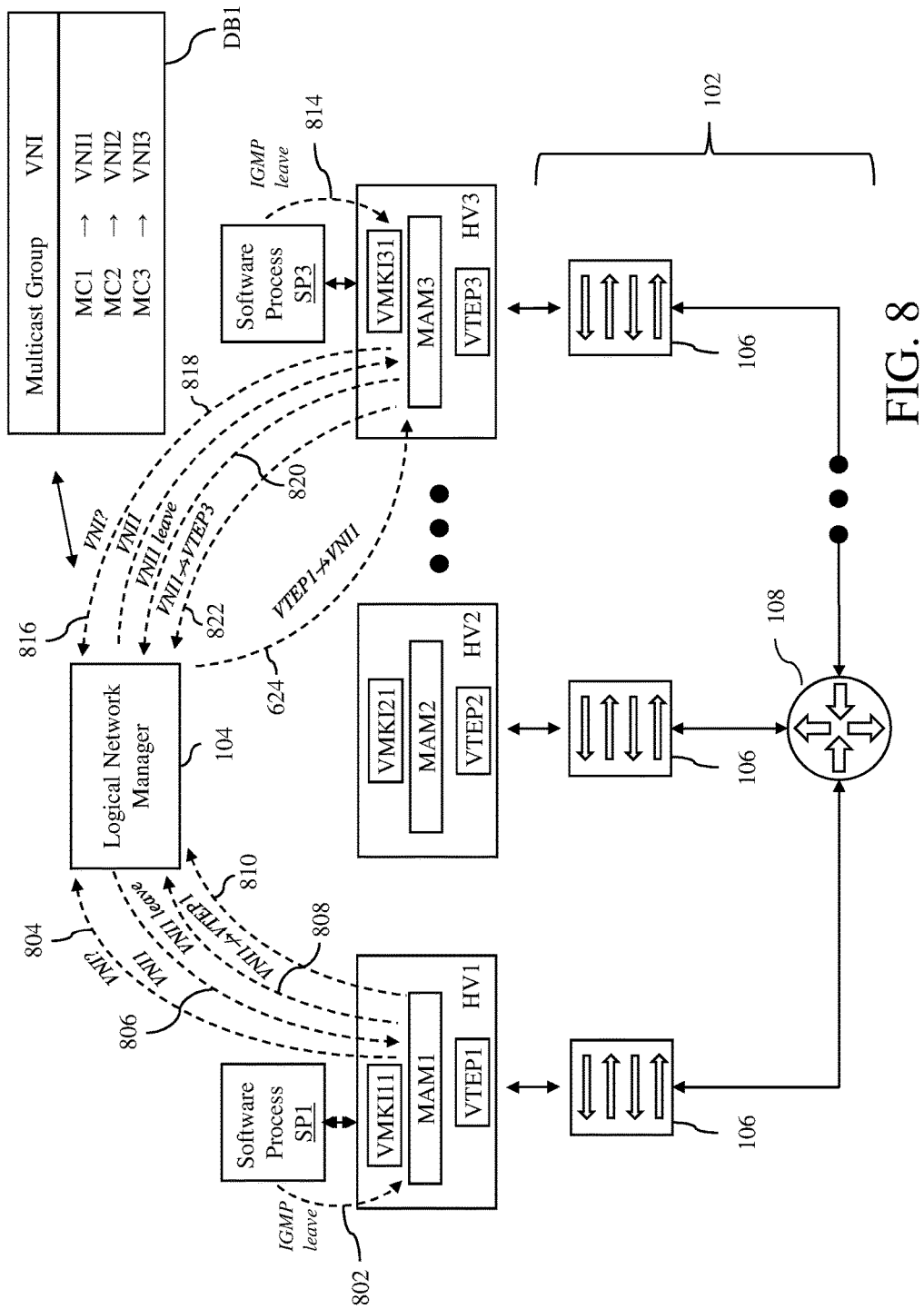
FIG. 8 illustrates the process of leaving a multicast group for networking interfaces of hypervisors in the distributed computer system in accordance with an embodiment of the invention.

The process of leaving a multicast group for networking interfaces of hypervisors in the distributed computer system 100 in accordance with an embodiment of the invention is further described using an example illustrated in FIG. 8. This example shown in FIG. 8 is similar to the example shown in FIG. 6 after the VMkernel interfaces VMKI11 and VMKI31 have joined the multicast group MC1.

In this description, it is assumed that the VMkernel interfaces VMKI11 and VMKI31 both want to leave the multicast group MC1. It is also assumed that the VMkernel interface VMKI11 will first leave the multicast group MC1 and then VMkernel interface VMKI31 will leave the multicast group MC1 as the last member of the group. It is further assumed that there is only one software process connected to each VMkernel interface.

For the VMkernel interface VMKI11 to leave the multicast group MC1, the software process SP1 sends out an IGMP leave message via the VMkernel interface VMKI11 to the multicast agent module MAM1, as indicated by the arrow 802. In response, the multicast agent module MAM1 sends a query to the logical network manager 104 for a VNI assigned to the multicast group MC1, as indicated by the arrow 804. In response to the query, the logical network manager looks up the VNI assigned to the multicast group MC1 in the multicast database DB1, which in this example is VNI1. The logical network manager then sends VNI1 assigned to the multicast group MC1 back to the multicast agent module MAM1, as indicated by the arrow 806. The multicast agent module MAM1 then sends a VNI1 leave message to the logical network manager, as indicated by arrow the 808. The multicast agent module MAM1 also sends a disassociation of VTEP1 with VNI1 to the logical network manager, as indicated by the arrow 810. The logical network manager then records the VTEP1 to VNI disassociation, e.g., remove VTEP1 to VNI1 association. In addition, the logical network manager propagates the VTEP1 to VNI1 disassociation to all the remaining hypervisors of the multicast group MC1, which is this example is only the hypervisor HV3, as indicated by the arrow 812. This notification may be achieved by sending a VTEP membership message as illustrated in FIG. 5 to the hypervisor HV3.

For the VMkernel interface VMKI31 to leave the multicast group MC1, the software process SP3 sends out an IGMP leave message via the VMkernel interface VMKI31 to the multicast agent module MAM3, as indicated by the arrow 814. In response, the multicast agent module MAM3 sends a query to the virtual the network manager 104 for a VNI assigned to the multicast group MC1, as indicated by the arrow 816. In response to the query, the logical network manager looks up the VNI assigned to the multicast group MC1 in the multicast database DB1, which in this example is VNI1. The logical network manager then sends VNI1 assigned to the multicast group MC1 back to the multicast agent module MAM3, as indicated by the arrow 818. The multicast agent module MAM3 then sends a VNI1 leave message to the logical network manager, as indicated by arrow the 820. The multicast agent module MAM3 also sends a disassociation of VTEP3 with VNI1 to the logical network manager, as indicated by the arrow 822. Since the VMkernel interface VMKI31 is the last member of the multicast group MC1, the logical network manager deletes the association of VNI1 to the multicast group MC1 from the multicast database.

Figure 9:
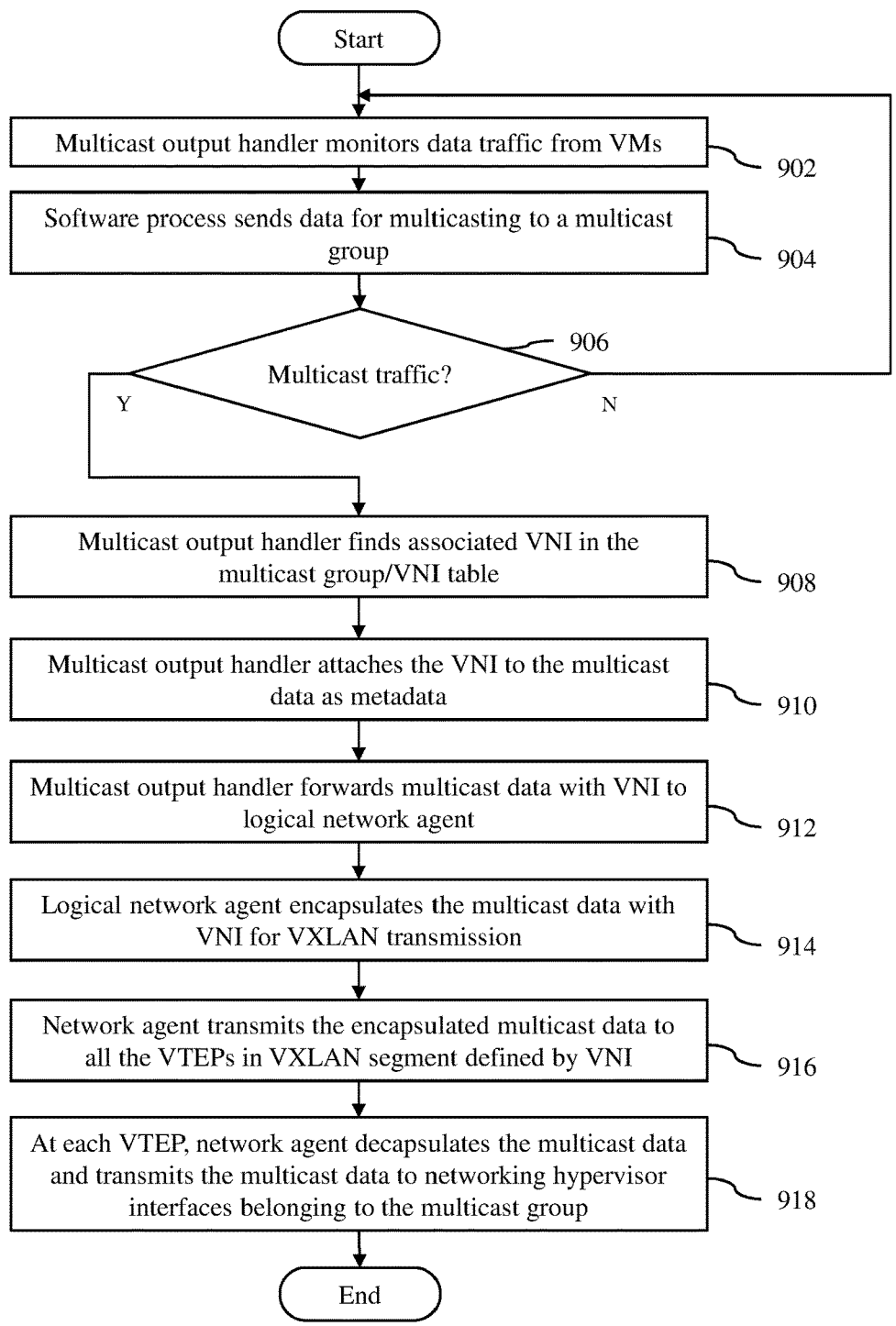
FIG. 9 is a flow diagram of a process of sending a multicast data for a multicast group between networking interfaces of hypervisors in the distributed computer system in accordance with an embodiment of the invention.

A process of sending a multicast data for a multicast group between networking interfaces of hypervisors in host computers in the distributed computer system 100 in accordance with an embodiment of the invention is described with reference to the flow diagram of FIG. 9. As shown in FIG. 9, the process for sending a multicast data begins at step 902, where a multicast output handler of a hypervisor monitors or snoops data traffic originating from networking interfaces of the hypervisor ("networking hypervisor interfaces").

Next, at step 904, a software process connected to a networking hypervisor interface of a host computer sends data for multicasting to a multicast group via the networking hypervisor interface. The data, which may be in the form of IP packets, includes a multicast group identification to indicate that the data is a multicast data to be multicast to the networking hypervisor interfaces belonging to the same multicast group.

Next, at step 906, the multicast output handler of the hypervisor determines whether the data from the network hypervisor interface is multicast data. If the data is not multicast data, the process proceeds back to step 902. However, if the data is multicast data, the multicast output handler finds the VNI assigned to the multicast group, as indicated in the data, at step 908. In an embodiment, the multicast output handler performs a lookup on a local multicast database, which includes VNIs assigned to different multicast groups, to find the VNI corresponding to the multicast group. Next, at step 910, the multicast output handler attaches the VNI to the multicast data as metadata. Next, at step 912, the multicast output handler forwards the multicast data with the VNI to the logical network agent of the hypervisor.

Next, at step 914, the logical network agent encapsulates the multicast data with the VNI for VXLAN transmission. In an embodiment, the logical network agent encapsulates original data packets into a new header, e.g., original Medium Access Control (MAC) frames into a User Datagram Protocol (UDP) header.

Next, at step 916, the network agent transmits the encapsulated multicast data to all VTEPs in the VXLAN segment defined by the VNI assigned to the multicast group. In an embodiment, the encapsulated multicast data is transmitted via flood mode to transmit the encapsulated multicast data to all the VTEPs in the VXLAN segment at different host computers.

Next, at step 918, at each VTEP of a host computer, the network agent of the hypervisor decapsulates the multicast data and transmits the multicast data to networking hypervisor interfaces belonging to the multicast group. In an embodiment, the IP addresses of the network hypervisor interfaces are used to route the multicast data to the right network hypervisor interfaces. Thus, all the software processes connected to networking interfaces of hypervisors in the multicast group will receive the multicast data from the source networking interface.

Figure 10:
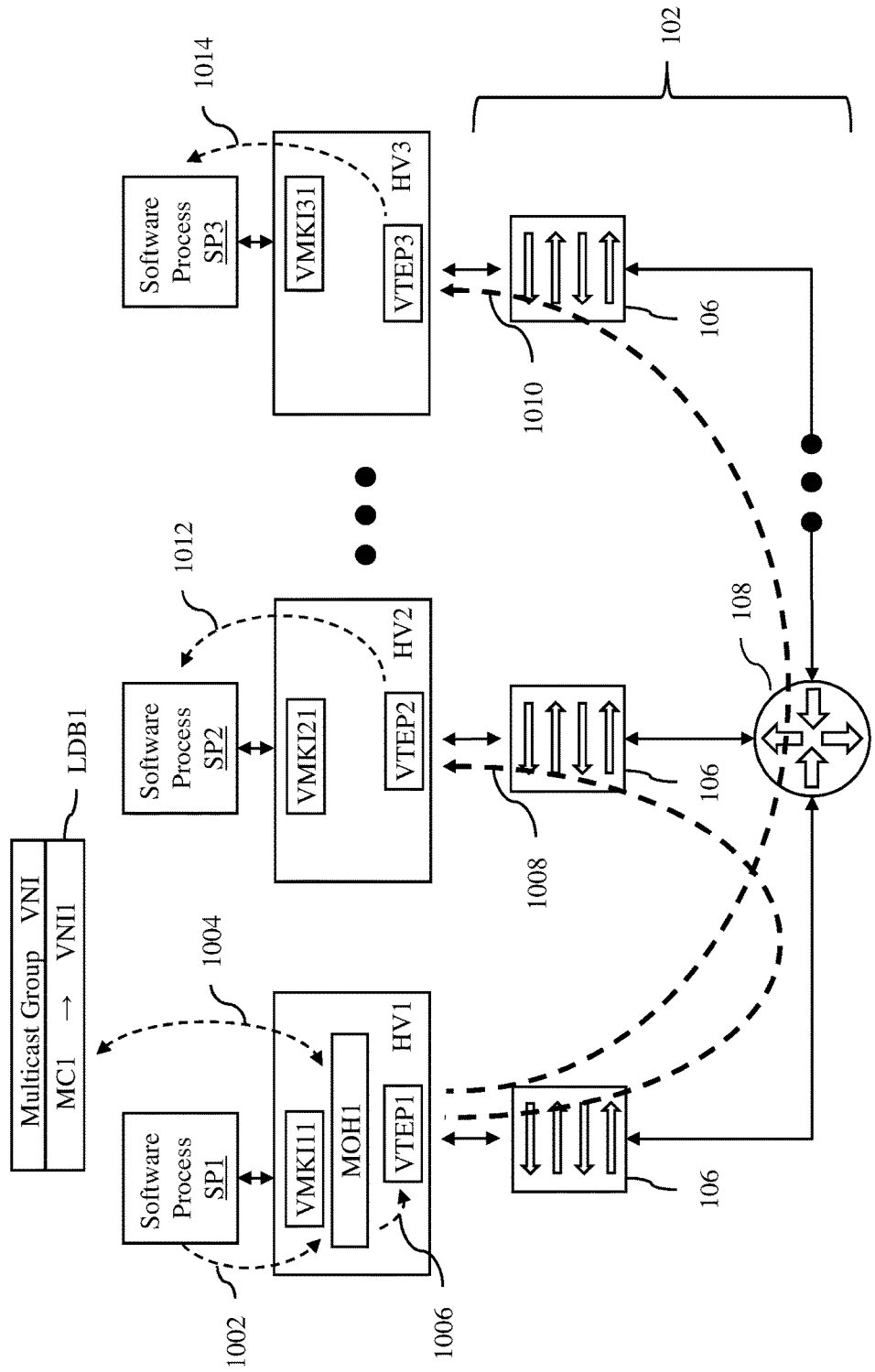
FIG. 10 illustrates the process of sending a multicast data for a multicast group between networking interfaces of hypervisors in the distributed computer system in accordance with an embodiment of the invention.

The process of sending multicast data for a multicast group of networking interfaces of hypervisors in host computers in the distributed computer system 100 in accordance with an embodiment of the invention is further described using an example illustrated in FIG. 10. This example shown in FIG. 10 is similar to the example shown in FIG. 6. However, in this example, the VMkernel interfaces VMKI11, VMKI21 and VMKI31 have joined the multicast group MC1. In addition, the VMkernel interfaces VMKI21 is connected to a software process SP2. In FIG. 10, the multicast agent modules of the hypervisors HV1, HV2 and HV3 are not shown. However, the multicast output handler MOH1 of the hypervisors HV1 is shown.

In this description, it is assumed that the software process SP1 connected to the VMkernel interface VMKI11 wants to send multicast data to the other members of the multicast group MC1, which in this example are the VMkernel interfaces VMKI21 and VMKI31.

For the software process SP1 to send multicast data to the multicast group MC1, the software process SP1 sends out multicast data via the VMkernel interface VMKI11, as indicated by the arrow 1002. The multicast output handler MOH1 of the hypervisor HV1 snoops the data traffic from the VMkernel interface VMKI11 and determines that multicast data is being transmitted to a multicast group, which in this example is the multicast group MC1. The multicast output handler MOH1 then looks up the VNI assigned to the multicast group MC1 in a local multicast database LDB1, which in this example is VNI1, as indicated by the arrow 1004. The multicast output handler MOH1 then attaches VNI1 to the multicast data as internal metadata, e.g., VNI is attached to each multicast data packet as internal metadata, and transmits the multicast data with VNI1 to the VTEP1. When the multicast data with VNI1 is received, the VTEP1 encapsulates the multicast data with VNI1 for VXLAN transmission and transmits the encapsulated multicast data to all VTEPs in the VXLAN segment defined by VNI1 assigned to the multicast group MC1, which in this example is the VTEP 2 and VTEP3. Thus, the encapsulated multicast data is transmitted to the VTEP2 of the hypervisor HV2, as indicated by the arrow 1008, and to the VTEP3 of the hypervisor HV3, as indicated by the arrow 1010.

At the hypervisor HV2, when the encapsulated multicast data is received, the VTEP2 decapsulates the multicast data and transmits the multicast data to the software process SP2 via the VMkernel interface VMKI21, as indicated by the arrow 1012. At the hypervisor HV3, when the encapsulated multicast data is received, the VTEP3 decapsulates the multicast data and transmits the multicast data to the software process SP3 via the VMkernel interface VMKI31, as indicated by the arrow 1014.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for multicasting data between networking interfaces of hypervisors in a distributed computer system, the method comprising:
   receiving a request to join a particular multicast group from a software process connected to a networking interface of a hypervisor in a host computer at a multicast agent module of the host computer;
   sending a query from the multicast agent module to a logical network manager for a Virtual Extensible LAN Network Identifier (VNI) assigned to the particular multicast group;
   receiving the VNI assigned to the particular multicast group from the logical network manager at the multicast agent module;
   sending a VNI join message to the logical network manager from the multicast agent module to join a Virtual Extensible LAN (VXLAN) segment defined by the VNI; and
   sending an identifier of a VXLAN Tunnel End Point (VTEP) of the host computer to the logical network manager from the multicast agent module to be associated with the VNI so that data being multicast for the particular multicast group can be routed to the networking interface via the VTEP.

2. The method of claim 1, further comprising:
   receiving multicast data from a source software process connected to a source networking interface of a source hypervisor in a source host computer at a multicast output handler of the source host computer, the source networking interface being a member of the particular multicast group;
   attaching the VNI assigned to the particular multicast group to the multicast data by the multicast output handler; and
   transmitting the multicast data with the VNI to all VTEPs associated with the particular multicast group.

3. The method of claim 1, wherein the networking interface of the hypervisor has an Internet Protocol (IP) address.

4. The method of claim 3, wherein the networking interface of the hypervisor is a VMkernel port of the hypervisor.

5. The method of claim 4, wherein the software process is a process of a VMkernel connected to the VMkernel port of the hypervisor.

6. The method of claim 1, wherein the identifier of the VTEP is an Internet Protocol (IP) address.

7. The method of claim 1, wherein the request to join the particular multicast group is an Internet Group Management Protocol (IGMP) join message.

8. The method of claim 1, further comprising propagating the identifier of the VTEP of the host computer to other hypervisors associated with the particular multicast group from the network manager.

9. The method of claim 1, wherein propagating the identifier of the VTEP of the host computer includes sending a VTEP membership message to the other hypervisors associated with the particular multicast group, the VTEP membership message including the VNI and identifiers of VTEPs associated with the VNI.

10. A non-transitory computer-readable storage medium containing program instructions for multicasting data between networking interfaces of hypervisors in a distributed computer system, wherein execution of the program instructions by one or more processors of a computer system causes the one or more processors to perform steps comprising:
   receiving a request to join a particular multicast group from a software process connected to a networking interface of a hypervisor in a host computer at a multicast agent module of the host computer;
   sending a query from the multicast agent module to a logical network manager for a Virtual Extensible LAN Network Identifier (VNI) assigned to the particular multicast group;
   receiving the VNI assigned to the particular multicast group from the logical network manager at the multicast agent module;
   sending a VNI join message to the logical network manager from the multicast agent module to join a Virtual Extensible LAN (VXLAN) segment defined by the VNI; and
   sending an identifier of a VXLAN Tunnel End Point (VTEP) of the host computer to the logical network manager from the multicast agent module to be associated with the VNI so that data being multicast for the particular multicast group can be routed to the networking interface via the VTEP.

11. The non-transitory computer-readable storage medium of claim 10, wherein the steps further comprise:
receiving multicast data from a source software process connected to a source networking interface of a source hypervisor in a source host computer at a multicast output handler of the source host computer, the source networking interface being a member of the particular multicast group;
attaching the VNI assigned to the particular multicast group to the multicast data by the multicast output handler; and
transmitting the multicast data with the VNI to all VTEPs associated with the particular multicast group.

12. The non-transitory computer-readable storage medium of claim 10, wherein the networking interface of the hypervisor has an Internet Protocol (IP) address.

13. The non-transitory computer-readable storage medium of claim 12, wherein the networking interface of the hypervisor is a VMkernel port of the hypervisor.

14. The non-transitory computer-readable storage medium of claim 13, wherein the software process is a process of a VMkernel connected to the VMkernel port of the hypervisor.

15. The non-transitory computer-readable storage medium of claim 10, wherein the identifier of the VTEP is an Internet Protocol (IP) address.

16. The non-transitory computer-readable storage medium of claim 10, wherein the request to join the particular multicast group is an Internet Group Management Protocol (IGMP) join message.

17. The non-transitory computer-readable storage medium of claim 10, wherein the steps further comprise propagating the identifier of the VTEP of the host computer to other hypervisors associated with the particular multicast group from the network manager.

18. The non-transitory computer-readable storage medium of claim 10, wherein propagating the identifier of the VTEP of the host computer includes sending a VTEP membership message to the other hypervisors associated with the particular multicast group, the VTEP membership message including the VNI and identifiers of VTEPs associated with the VNI.

19. A host computer of a distributed computer system comprising:
memory; and
a processor configured to:
receive a request to join a particular multicast group from a software process connected to a networking interface of a hypervisor in the host computer at a multicast agent module of the host computer;
send a query from the multicast agent module to a logical network manager of the distributed computer system for a Virtual Extensible LAN Network Identifier (VNI) assigned to the particular multicast group;
receive the VNI assigned to the particular multicast group from the logical network manager at the multicast agent module;
send a VNI join message to the logical network manager from the multicast agent module to join a Virtual Extensible LAN (VXLAN) segment defined by the VNI; and
send an identifier of a VXLAN Tunnel End Point (VTEP) of the host computer to the logical network manager from the multicast agent module to be associated with the VNI so that data being multicast for the particular multicast group can be routed to the networking interface via the VTEP.

20. The host computer of claim 19, wherein the processor is further configured to:
receive multicast data from the software process connected to the networking interface of the hypervisor in the host computer at a multicast output handler of the host computer, the networking interface being a member of the particular multicast group;
attach the VNI assigned to the particular multicast group to the multicast data by the multicast output handler; and
transmit the multicast data with the VNI to all VTEPs associated with the particular multicast group.

* * * * *